US010372108B2

(12) United States Patent
Cosgrove Thomas et al.

(10) Patent No.: US 10,372,108 B2
(45) Date of Patent: Aug. 6, 2019

(54) PRODUCTION OF COMPONENTS OF CUSTOM STRUCTURES

(71) Applicant: PopUp Play Inc., Austin, TX (US)

(72) Inventors: Amelia Cosgrove Thomas, Austin, TX (US); Bryan Thomas, Austin, TX (US); Paul Zain, Austin, TX (US)

(73) Assignee: PopUp Play Inc., Austin, TX (US)

( * ) Notice: Subject to any disclaimer, the term of this patent is extended or adjusted under 35 U.S.C. 154(b) by 387 days.

(21) Appl. No.: 15/231,372

(22) Filed: Aug. 8, 2016

(65) Prior Publication Data

US 2017/0038766 A1 Feb. 9, 2017

Related U.S. Application Data

(60) Provisional application No. 62/202,829, filed on Aug. 8, 2015.

(51) Int. Cl.
*G05B 19/4097* (2006.01)
*G05B 15/02* (2006.01)

(52) U.S. Cl.
CPC ......... *G05B 19/4097* (2013.01); *G05B 15/02* (2013.01); *G05B 2219/35012* (2013.01); *G05B 2219/45044* (2013.01)

(58) Field of Classification Search
CPC ............... G05B 15/02; G05B 19/4097; G05B 2219/35012; G05B 2219/45044
See application file for complete search history.

(56) References Cited

U.S. PATENT DOCUMENTS

| 7,599,088 | B2* | 10/2009 | Bru | G06F 17/50 345/419 |
| 8,775,130 | B2* | 7/2014 | Walker | G06F 17/50 703/1 |
| 8,797,605 | B2* | 8/2014 | Hannaway | G06F 17/50 358/3.28 |
| 9,460,056 | B2* | 10/2016 | Wayman | G06F 17/211 |
| 9,536,344 | B1* | 1/2017 | Baszucki | G06T 13/40 |
| 2004/0247173 | A1* | 12/2004 | Nielsen | G06T 3/0062 382/154 |
| 2008/0250837 | A1* | 10/2008 | Durney | B21D 5/16 72/319 |
| 2010/0110479 | A1* | 5/2010 | Gombert | G06F 17/50 358/1.15 |

(Continued)

*Primary Examiner* — Abdelmoniem I Elamin
(74) *Attorney, Agent, or Firm* — Mueting, Raasch & Gebhardt, P.A.

(57) ABSTRACT

One aspect of the technology relates to a method for production of components of a custom structure. A design is electronically received remotely from a client, where the design has a structure having one or more three-dimensional components, and a graphic positioned on the structure. At least one two-dimensional manufacturing drawing is acquired from a database corresponding to each three-dimensional component, where each manufacturing drawing defines a cut location. In response to acquiring the at least one two-dimensional manufacturing drawings, the graphic is mapped to the two-dimensional manufacturing drawing consistently with the position of the graphic on the structure. Each acquired manufacturing drawing and the mapped graphic is electronically sent to a computer numeric control (CNC) cutting system.

18 Claims, 13 Drawing Sheets

(56) References Cited

U.S. PATENT DOCUMENTS

| | | | | |
|---|---|---|---|---|
| 2014/0063558 A1* | 3/2014 | Holroyd | ................ | B29C 65/002 |
| | | | | 358/3.22 |
| 2015/0317411 A1* | 11/2015 | Furst | ....................... | G06F 17/50 |
| | | | | 703/1 |
| 2016/0154563 A1* | 6/2016 | Newton | .............. | G06F 3/04815 |
| | | | | 715/762 |

* cited by examiner

PRODUCTION OF COMPONENTS OF CUSTOM STRUCTURES

This application is a non-provisional application claiming priority to U.S. Provisional Application No. 62/202,829, filed Aug. 8, 2015, and the entire contents of the U.S. Provisional Application are incorporated herein by reference.

FIELD OF THE TECHNOLOGY

The technology disclosed herein generally relates to custom structures. More particularly, the technology disclosed herein relates to the production of components of custom structures.

SUMMARY

In some embodiments, the technology disclosed herein is a method of production of components of a custom structure. A design is electronically received remotely from a client, where the design has a structure having one or more three-dimensional components and a graphic positioned on the structure. At least one two-dimensional manufacturing drawing corresponding to each three-dimensional component is acquired from a database, where each manufacturing drawing defines a cut location. In response to acquiring the at least one two-dimensional manufacturing drawings, the graphic is mapped to the two-dimensional manufacturing drawing consistently with the position of the graphic on the structure. Each acquired manufacturing drawing and the mapped graphic is electronically sent to a computer numeric control (CNC) cutting system.

In some embodiments, the technology disclosed herein is a system for production of components of custom structures. The system has a database having a plurality of two-dimensional manufacturing drawings each defining a cut location. A server is configured to receive a user design of a structure defined by one or more three-dimensional components and a graphic, where each of the three-dimensional components has at least one corresponding two-dimensional manufacturing drawing in the database. A selection module is configured to acquire each of the corresponding two-dimensional manufacturing drawings from the database in response to receiving the user design of the structure. An instruction module is configured to receive the two-dimensional manufacturing drawings and map the graphic to one or more of the acquired two-dimensional manufacturing drawings consistently with the user design of the structure. The server is further configured to send each acquired two-dimensional manufacturing drawing and the mapped graphic to a computer numeric control (CNC) cutting system.

BRIEF DESCRIPTION OF THE DRAWINGS

The current technology may be more completely understood and appreciated in consideration of the following detailed description of various embodiments of the current technology in connection with the accompanying drawings.

DETAILED DESCRIPTION

The technology that will be described herein generally relates to the automated production of components for user-designed three-dimensional custom structures. One non-limiting high level example implementation of the current technology will now be described, which is used to contextualize the technology explained further herein. In the example implementation, a user designs a three-dimensional structure on a personal computing device, where the three-dimensional structure is configured to be constructed from sheet material such as cardboard. The user places an order for the designed three-dimensional structure, which is electronically received by a location remote from the user's location.

In response, a system consistent with the technology disclosed herein receives the design and automatically creates and formats instructions to be read by the manufacturing equipment that can be at least a printer and a computer numeric control (CNC) cutter. The instructions are automatically sent to the manufacturing equipment for production of the components of the designed structure. The manufacturing equipment generally preserves the sheet configuration of the sheet material—such that the components can be relatively efficiently shipped to the user—but is otherwise configured to cut, print, and possibly crease the sheet material such that the user can construct the designed three-dimensional structure from the sheet material. After production by the manufacturing equipment of the components of the designed structure, the components are packaged and shipped to the user for construction of the designed structure.

Figure 1:
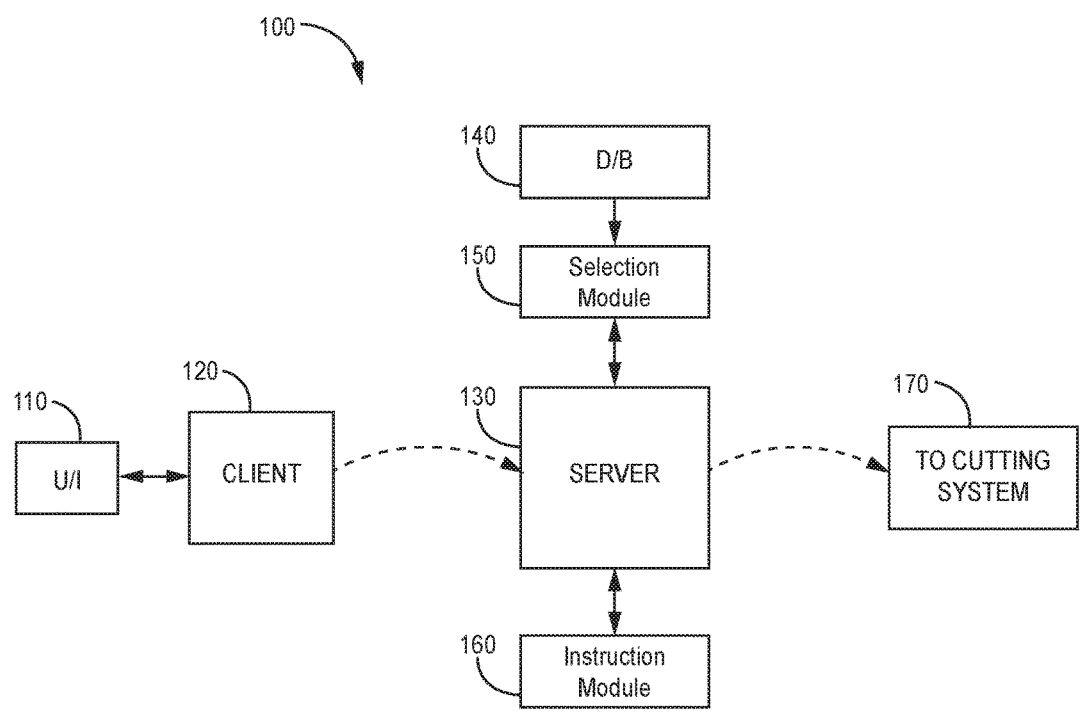
FIG. 1 depicts an example system consistent with the technology disclosed herein.

Turning now to the figures, FIG. 1 depicts an example system consistent with the technology disclosed herein. The system generally has a client 120, a server 130, a selection module 150, an instruction module 160 and a database 140. The system is generally configured to communicate a custom design of a structure and produce components of the structure. In various embodiments, the structure is configured to be constructed of cut-able sheets of material. The sheets of material can generally be cut by a CNC cutting system, where the system can have a cutter and a printer arranged in a series. The sheets of material can be a variety of different materials and combinations of materials. Materials such as cardboard, plastic, wood and sheet metal are contemplated. In some embodiments the sheets of material are foldable. In some embodiments the sheets of material are weldable.

The client 120 is generally configured to receive a user's custom design of a structure and communicate the design to the server 130. The client 120 can be a software program, application, or the like that is configured to be executed on hardware such as a personal computer, tablet, smart phone, or other personal computing device. In some embodiments the client 120 is a web application that is configured to be accessed through a personal computing device. An example personal computing device is described below in association with FIG. 13.

The client 120 is configured to be in communication with a user interface 110 such that the client 120 enables a user to design a custom structure. While the term "user interface" is used in the singular tense for simplicity, it will be appreciated that one or more user interfaces 110 can be used in systems consistent with the current technology. For example, a keyboard, a touch screen, a mouse, and other user interfaces can be used in various combinations to enable the user to design the custom structure through the client 120. In some examples, the user interface 110 is at least a touch screen, and in some examples the user interface 110 is at least a touch screen and a speaker.

In some implementations, the client 120 is configured to display a plurality of pre-defined three-dimensional components as design options to a user through the user interface 110. In such implementations, each of the components in the plurality of pre-defined three-dimensional components are configured to couple to other components in the plurality of pre-defined three-dimensional components to define custom structures. As such, the client 120 has a custom structure generator or similar component that is configured to enable a user to select one or more three-dimensional components from the plurality of three-dimensional components to form the custom structure. In some embodiments the client 120 is configured to enable the user to select two or more three-dimensional components from the plurality of three-dimensional components to form the custom structure. In some embodiments the client 120 has a custom structure generator or similar component that is configured to enable the user to arrange the two or more three-dimensional components to form the custom structure. In this way, the client 120 can provide a relative simplification of the design process.

The client 120 can also be configured to allow the user to design the custom structure by positioning one or more graphics on the custom structure. The graphics are generally two dimensional images that are printable by a printer. In some embodiments a graphic can be uploaded to the client 120 by the user to be positioned on the custom structure. In some embodiments the client 120 is configured to provide optional pre-defined graphics to the user through the user interface 110. In some embodiments the client 120 allows the user to personalize selected pre-defined graphics. In some embodiments, the client 120 can also be configured to allow the user to design the custom structure by defining one or more cut-out features on the custom structure. An example custom structure demonstrating example design options available to a user will now be described in more detail.

Figure 2:
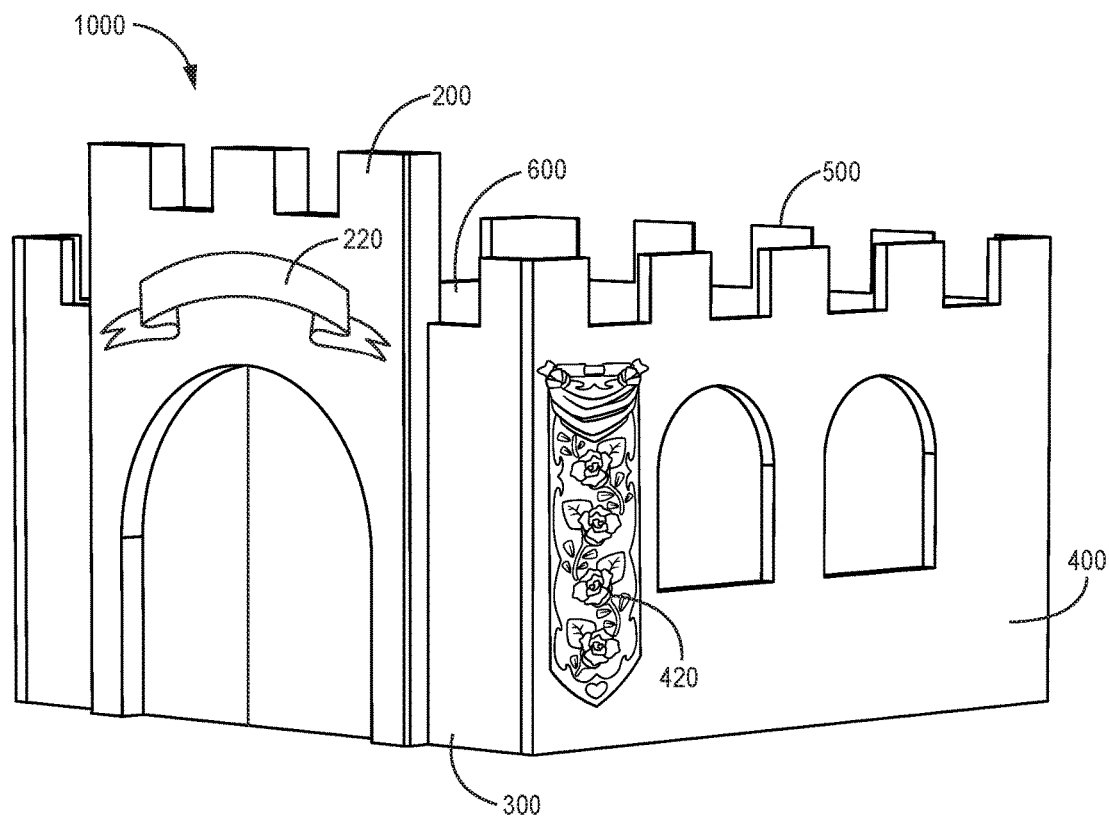
FIG. 2 depicts an example design of a custom structure.

FIG. 2 depicts an example design of a custom structure consistent with the technology disclosed herein. In this example, the custom structure 1000 is a play house castle. The custom structure 1000 is defined by one or more, and commonly two or more three-dimensional components 200, 300, 400, 500, 600 and at least one graphic 220, 420 positioned on the structure 1000. FIGS. 3-7 depict each of the three-dimensional components individually, respectively.

The custom structure 1000 is an example designed by a user via the client 120 through a user interface 110 (see FIG. 1). As such, through the user interface 110, the client 120 (FIG. 1) is configured to display a plurality of three-dimensional components from which the user selects and arranges the five three-dimensional components 200, 300, 400, 500, 600 and two graphics 220, 420 to design the structure 1000.

Figure 3:
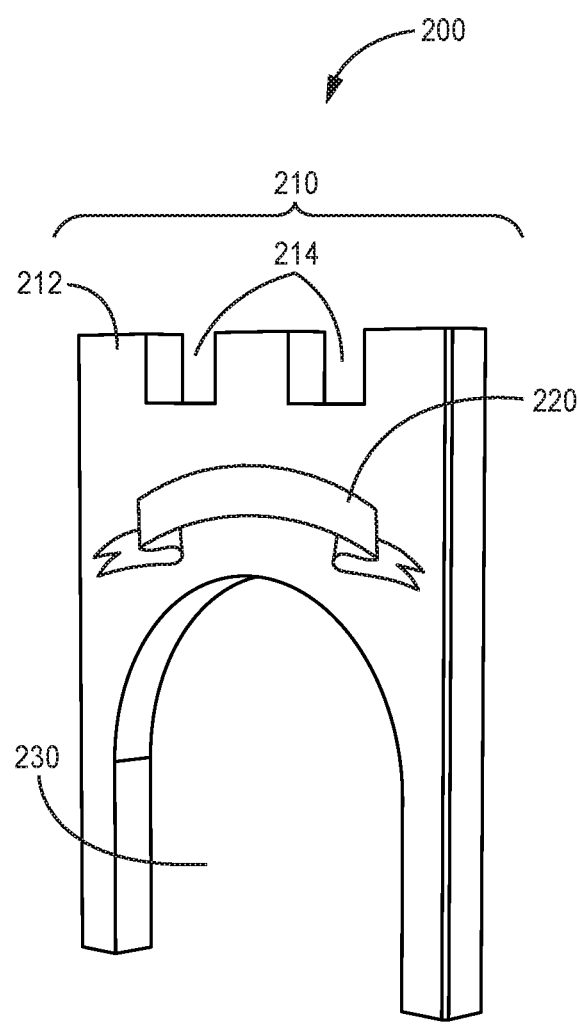
FIG. 3 depicts a first component of the custom structure.
Figure 4:
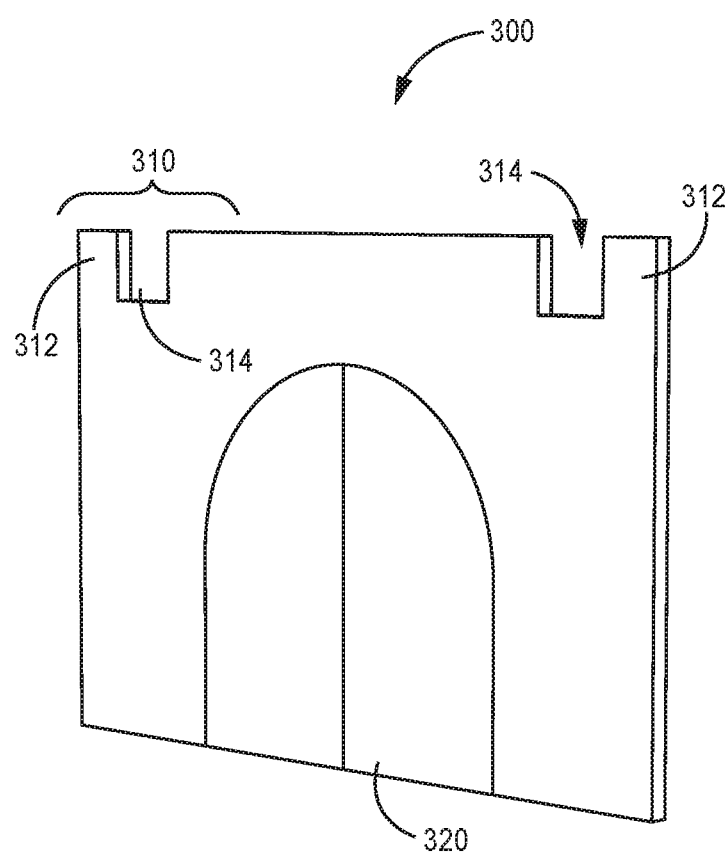
FIG. 4 depicts a second component of the custom structure.

FIG. 3 depicts a first three-dimensional component of the designed structure 1000 (FIG. 2) which is an entryway 200. The entryway 200 has a battlement 210 defined by merlons 212 and crenels 214, a doorway 230, and a graphic 220 over the doorway 230. FIG. 4 depicts a second three-dimensional component of the designed structure 1000 (FIG. 2) which defines a front wall 300 of the castle. The entrance wall has battlements 310 defined by merlons 312 and crenels 314 and a door 320 that is configured to align with the doorway 230 of the entryway 200 (FIG. 3).

Figure 5:
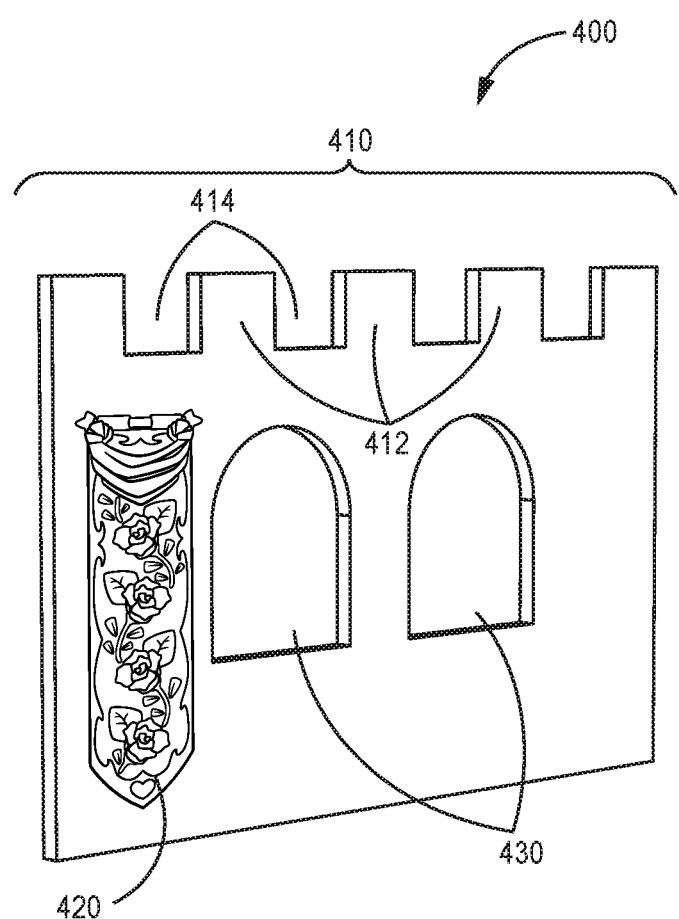
FIG. 5 depicts a third component of the custom structure.
Figure 6:
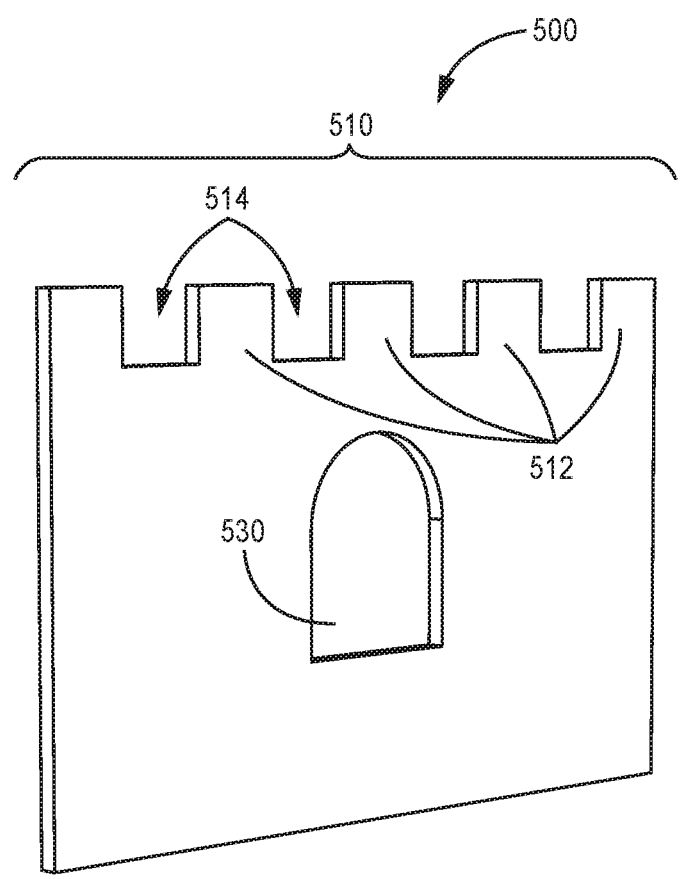
FIG. 6 depicts a fourth component of the custom structure.
Figure 7:
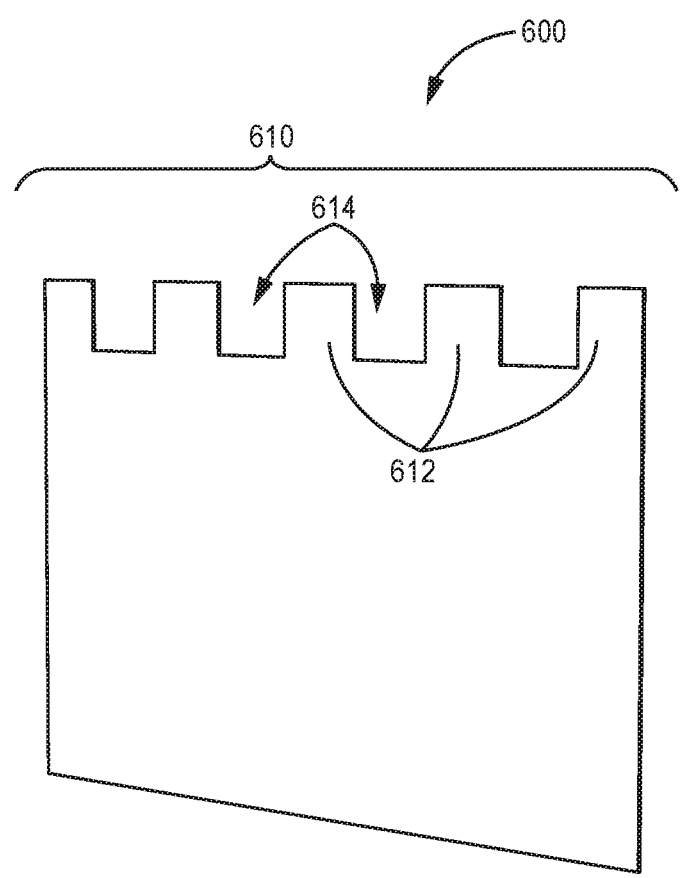
FIG. 7 depicts a fifth component of the custom structure.

FIG. 5 depicts a third three-dimensional component of the designed structure 1000 (FIG. 2) which is first sidewall 400 of the castle. The first sidewall 400 has a battlement 410 defined by merlons 412 and crenels 414, a graphic 420, and two windows 430. FIG. 6 depicts a fourth three-dimensional component of the designed structure 1000 (FIG. 2) which is second sidewall 500 of the castle. The second sidewall 500 has a battlement 510 defined by merlons 512 and crenels 514 and a window 530. FIG. 7 depicts a fifth three-dimensional component of the designed structure 1000 (FIG. 2) which is a back wall 600 of the castle. The back wall 600 has a battlement 610 defined by merlons 612 and crenels 614.

Generally the designed structure 1000 is constructible from a plurality of sheets of cut-able material that are physically coupled. Further, each of the plurality of three-dimensional components are also generally constructible from one or more sheets of cut-able material, such as cardboard. In some embodiments the plurality of three-dimensional components and the designed custom structure 1000 displayed by the client 120 through the user interface 110 (FIG. 1) have embellishments, such as depicted in FIGS. 2-7, such that the actual constructed structure is as an approximation of the designed structure 1000. For example, the representations of the designed structure 1000 and its three-dimensional components can be depicted by the client 120 as being an actual castle or a cartoon representation of a castle to provide the user with the perception that s/he is designing a castle. For example, the designed structure 1000 can have thicknesses that are inconsistent with the thickness of the sheets of material that are used to construct the structure 1000, such as the depicted thicknesses of the merlons 210 on the entryway 200 (FIG. 3). As another example, in some embodiments the designed structure 1000 does not depict details that would be visible in the constructed structure, such as corrugations at the edges of the cardboard (in embodiments where cardboard is used to construct the designed structure), or the connections between the three-dimensional components.

In various embodiments, the general three-dimensional structure of each three-dimensional component is pre-defined by the client 120. However, in some embodiments the client 120 is configured to allow a user to design and define cut-out features in the structure. A cut-out feature is generally defined herein as a portion of the structure that is cut through to form a feature such as, for example, the windows 430, 630, doorway 230, the door 320, and the battlements

210, 310, 410, 510, 610 of FIGS. 3-7. In various implementations a user design of a structure defines at least one cut-out feature. Other types of cut-out features through the structure are also contemplated. In some embodiments, the client 120 pre-defines the shapes of optional cut-out features to be selected and positioned on the structure 1000 by the user. In some such embodiments, the user can define the size of the cut-out feature, and in some embodiments the size of the cut-out feature is pre-defined by the client 120. In some embodiments a portion of the cut-out features are pre-defined options but the client 120 can also be configured to receive user-designed cut-out features.

In some embodiments the client 120 can be configured to guide a user in the design of the custom structure. For example, the client 120 can have a feedback generator configured to provide relatively positive feedback to the user through a user interface 110 each time the user selects a three-dimensional component and couples the three-dimensional component to another selected three-dimensional component in an acceptable location, where an "acceptable location" is intended to mean that the resulting three-dimensional structure would be constructible and dimensionally stable as part of a completed designed structure. The feedback can be a visual and/or audio cue, as examples. So, with reference to FIGS. 2-5, the client 120 (FIG. 1) can be configured to provide relatively positive feedback to a user when the user aligns the doorway 230 with the door 320 to connect the entryway 200 with the front wall 300, and provide no feedback or relatively negative feedback when a user attempts to connect the doorway 230 of the entryway 200 with the first sidewall 400.

Returning again to FIG. 1, the client 120 is configured for communication with the server 130. The server 130 is generally configured to be remote from the client 120 and electronically receive the user design of the structure from the client 120. In some embodiments the client 120 receives data from the server 130 such as software updates. The server can be a computing device and/or software code that is configured to be executed by the computing device. The server can have a central processing unit (CPU), memory units, and is in communication with a wide area network such as the Internet. The server 130 is generally in communication with a selection module 150 and an instruction module 160, although in some embodiments the selection module 150 and the instruction module 160 are components of the server 130. In some other embodiments the selection module 150 and the instruction module 160 define a single component that is in communication with the server 130. The selection module 150 is generally in communication with the database 140, where the database 140 can be a component of the server, but is not necessarily a component of the server.

The database 140 generally stores a plurality of two-dimensional manufacturing drawings. The plurality of pre-defined three-dimensional components that are provided as design options to the user from the client 120 corresponds to the plurality of two-dimensional manufacturing drawings in the database 140. At least one two-dimensional manufacturing drawing corresponds to each three-dimensional component.

The two-dimensional manufacturing drawings generally define instructions for the production of the relevant three-dimensional components from the sheets of material. The two-dimensional manufacturing drawings are generally readable by a computer numeric control (CNC) cutting system. Each two-dimensional manufacturing drawing defines at least one cut location, where the system cuts the sheet of the material at locations corresponding to the cut locations on the two-dimensional manufacturing drawings. In some embodiments, at least one two-dimensional manufacturing drawing associated a three-dimensional component of a designed structure defines a crease line. Generally a portion of the plurality of two-dimensional manufacturing drawings in the database 140 each defines a crease line. The CNC cutting system can identify the crease lines on the two-dimensional manufacturing drawing and apply pressure to the sheet of material at corresponding locations to form creases in the material. The crease line(s) on the sheet of material define fold locations for the user when constructing the designed structure from the sheets of material.

Figure 8:
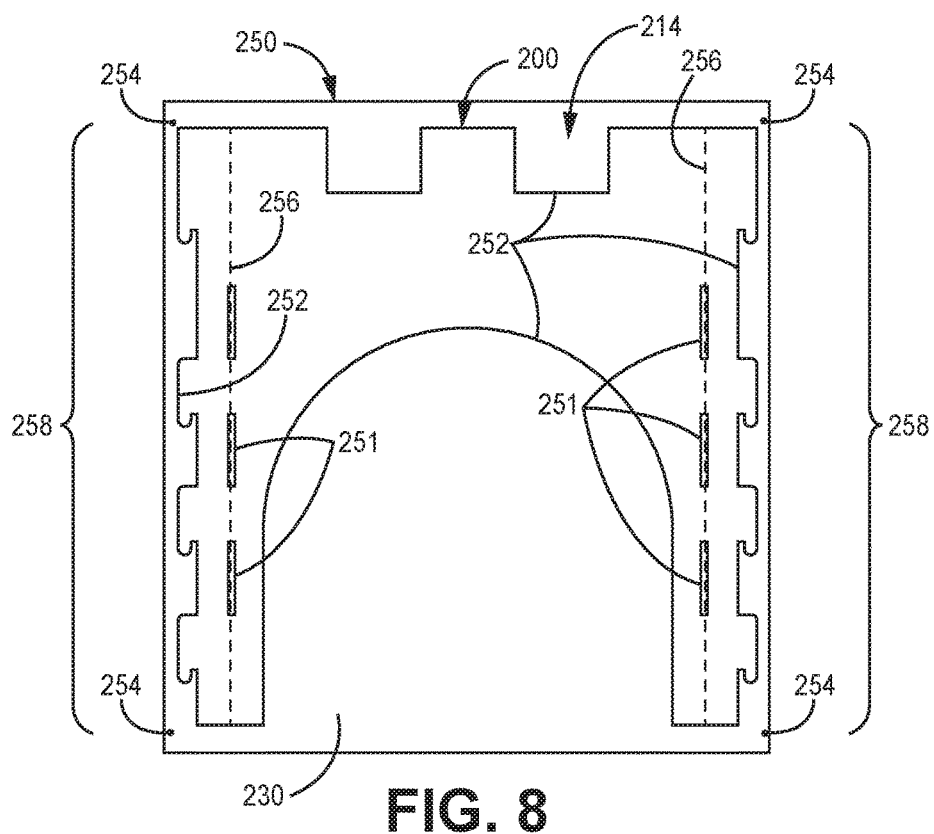
FIG. 8 depicts an example manufacturing drawing of the first component of the custom structure.
Figure 10:
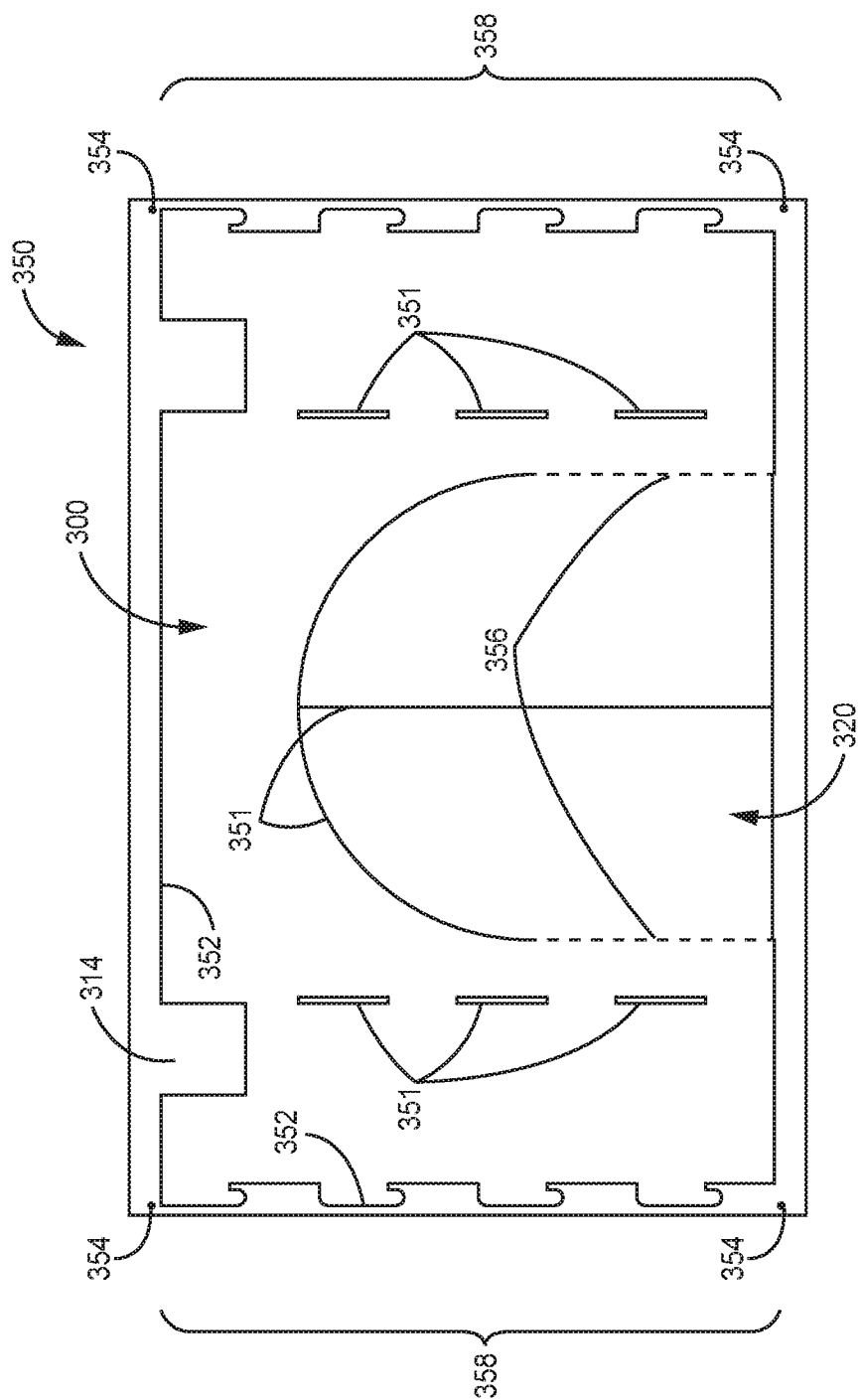
FIG. 10 depicts an example manufacturing drawing of the second component of the custom structure.
Figure 11:
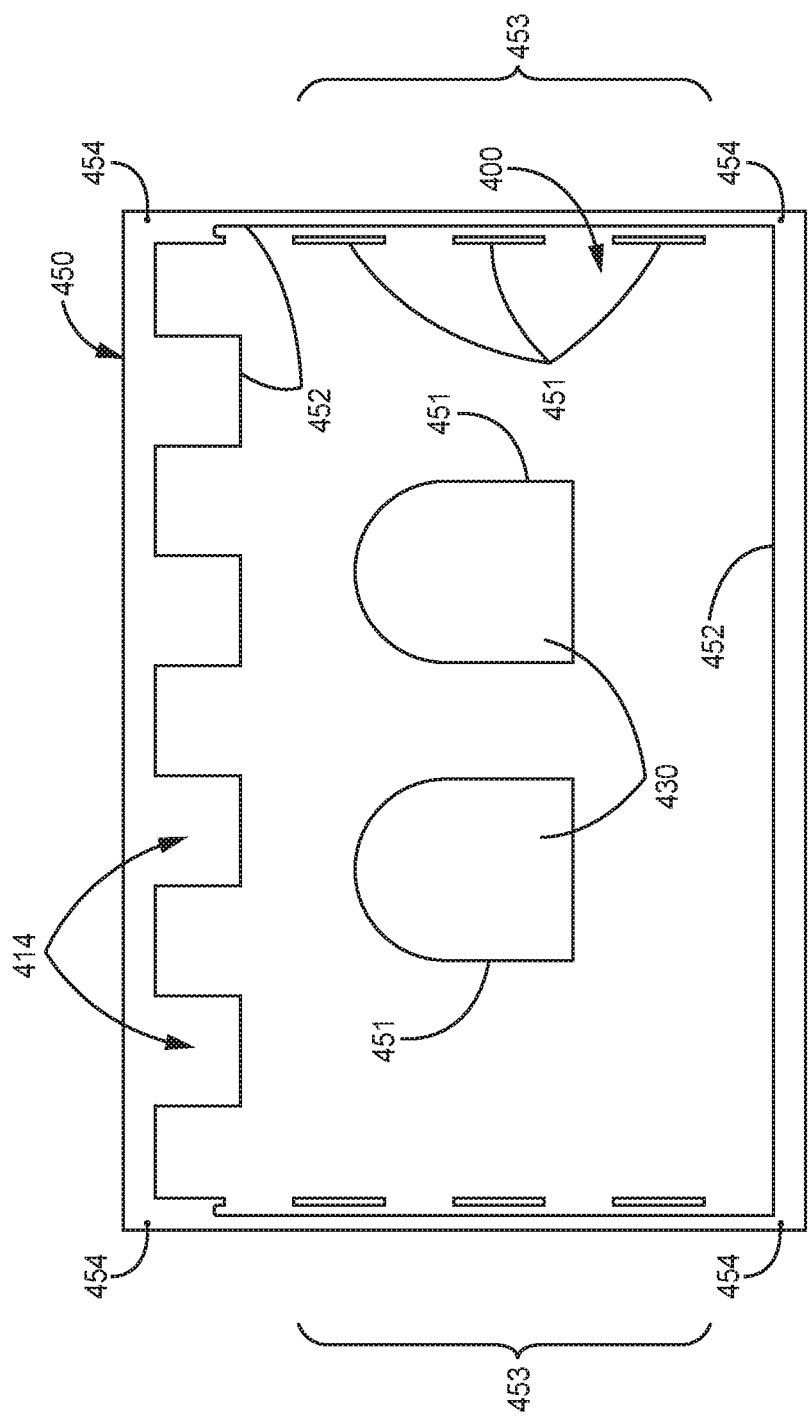
FIG. 11 depicts an example manufacturing drawing of the third component of the custom structure.

FIGS. 8, 10, and 11 depict example manufacturing drawings corresponding to the entryway 200, the front wall 300, and the first sidewall 400, respectively. Referring to FIG. 8, the entryway manufacturing drawing 250 defines a perimeter cut location 252 that defines the outer perimeter of the sheet that will be used to construct the entryway 200. The perimeter cut location 252 defines the locations of the cut-out features defining the doorway 230 and the crenels 214. The perimeter cut location 252 also defines connector structures 258 that are configured to couple to other three-dimensional components of the designed structure. A plurality of secondary cut locations 251 are also defined in the manufacturing drawing 250. The secondary cut locations 251 are configured to align with a crease line 256.

Referring to FIG. 10, the front wall two-dimensional manufacturing drawing 350 defines a perimeter cut location 352 that defines the outer perimeter of the sheet that will be used to construct the front wall 300 (FIG. 4). The perimeter cut location 352 defines the locations of the cut-outs defining the crenels 314. The perimeter cut location 352 also defines connector structures 358 that are configured to couple to other three-dimensional components of the designed structure. A plurality of interior cut locations 351 define connector receptacles 353 that are configured to receive connector structures from another three-dimensional component, such as the connector structure 258 (FIG. 8) of the entryway 200. Some of the plurality of interior cut locations 351 define the door 320 of the entry wall 300 and crease lines 356 define a door "hinge."

Referring to FIG. 11, the first sidewall two-dimensional manufacturing drawing 450 defines a perimeter cut location 452 that defines the outer perimeter of the sheet that will be used to construct the first sidewall 400 (FIG. 5). The perimeter cut location 452 defines the locations of the cut-outs defining the crenels 414. A plurality of interior cut locations 451 define connector receptacles 453 that are configured to receive connector structures from another three-dimensional component, such as the connector structure 358 (FIG. 10) of the front wall 300. An interior cut location 451 also defines two cut-out features that each defines a window 430.

While in the examples of FIGS. 8, 10 and 11 each depict two-dimensional manufacturing drawings for components constructed of a single sheet of a cut-able material, it will be appreciated that in some embodiments a three-dimensional component can be constructed of more than one sheet of cut-able material. In such embodiments, one two-dimensional manufacturing drawing will generally define the production of each sheet of cut-able material used to construct the three-dimensional component. For example, if a three-dimensional component is constructed of two sheets of cut-able material, two two-dimensional manufacturing drawings would be generated, where each manufacturing drawing corresponds to one sheet of cur-able material.

The two-dimensional manufacturing drawings consistent with FIGS. 8, 10 and 11 are generally consistent with the two-dimensional manufacturing drawings in the database 150 of FIG. 1. However, as explained above, in some embodiments one or more cut-out features such as the doorway 230 (FIG. 8), the door 320 (FIG. 10), the windows 430 (FIG. 11), and the crenels 214, 314, 414 (FIGS. 8, 10 and 11) can be absent from the two-dimensional manufacturing drawing in the database 150. In such embodiments, the system is configured to add cut locations associated with the cut-out features to the two-dimensional manufacturing drawings before sending the drawings to the cutting system. Such embodiments will be described further below.

Referring again to FIG. 1, when the design of the structure is received by the server 130 from the client 120, the system identifies each three-dimensional component in the structure and automatically acquires the corresponding two-dimensional manufacturing drawings from the database 150. In a variety of embodiments the selection module 150 is configured to acquire each of the corresponding manufacturing drawings from the database 150 in response to receiving the user design of the structure. In some embodiments the client 120 identifies each three-dimensional component in the structure and provides that data to the selection module 150. In some embodiments the server 130 and/or the selection module 150 identify each three-dimensional component in the designed structure to acquire each corresponding manufacturing drawing from the database 150.

In response to acquiring the two-dimensional manufacturing drawings, the system 100 is generally configured to automatically map the relevant graphic(s) to the manufacturing drawings consistently with the position of the graphic on the user-designed structure. Mapping the graphic to the two-dimensional manufacturing drawing generally means that data is generated that defines the size, location, and orientation of the graphic relative to the instructions on the two-dimensional manufacturing drawing. The mapped graphic is generally readable by one or more components of the CNC cutting system. In some embodiments, the instruction module 160 is configured to receive the two-dimensional manufacturing drawings and map the graphic to one or more of the acquired two-dimensional manufacturing drawings consistently with the user design of the structure. In various embodiments, the client 120 can have a positional data generator, for example, that is configured to record data associated with the graphic including the graphic itself and the position and size of the graphic relative to the designed structure and/or a three-dimensional component defining the designed structure. In such embodiments, the client 120 is configured to send that recorded data to the server 130 and the instruction module 160 is configured to receive and interpret the recorded data to map the graphic to the two-dimensional manufacturing drawing.

In various embodiments components of the system 100, or in particular the instruction module 160, is configured to generate printer instructions that is the graphic. The printer instructions are readable by a printer. Generally the CNC cutting system that is configured to produce the components of the custom structure incorporates the cutter and a printer arranged in a series. As such, it can be desirable that each of the cutter and the printer are properly aligned when cutting and printing the components of the custom structure.

The instruction module 160 is configured to position the graphic defining the printer instructions relative to the relevant acquired two-dimensional manufacturing drawing. The printer instructions and the two-dimensional manufacturing drawing can be in a single file readable by both the printer and the CNC cutter or in separate files. In some embodiments the system 100, or in particular the instruction module 160, applies registration marks to the printer instructions and the acquired two-dimensional manufacturing drawings, where the registration marks are readable by the CNC cutter and/or the printer. In various embodiments the system maps the graphic to the two-dimensional manufacturing drawing by applying registration marks to the two-dimensional manufacturing drawing and the printer instructions. In some embodiments the instruction module 160 is configured to position the graphic on the one or more acquired two-dimensional manufacturing drawings. In some such embodiments the system can further be configured to divide the two-dimensional manufacturing drawings with the graphic to create two files, one of which that can be read by a printer, and the other of which can be read by a CNC cutter.

Figure 9:
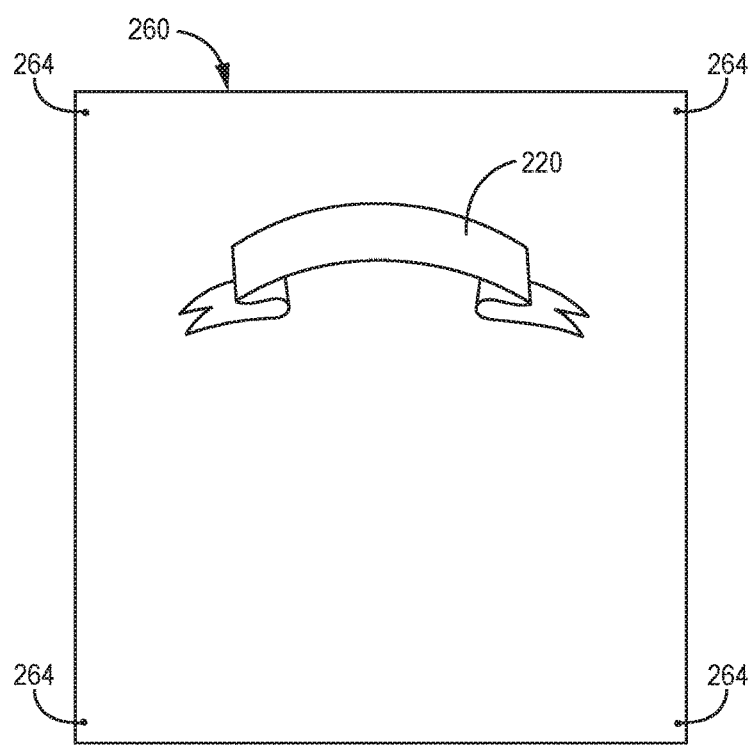
FIG. 9 depicts example printer instructions for the first component of the custom structure.

FIG. 9 depicts an example printer instruction consistent with one implementation of the technology disclosed herein. FIG. 9 reflects the printer instructions for the graphic 220 on the entryway 200 (FIG. 3) and also defines registration marks 264 that map the graphic 220 to the two-dimensional manufacturing drawing 250 (FIG. 8) of the entryway component 200. Similarly, the two-dimensional manufacturing drawing 250 defines corresponding registration marks 254 that are readable by the CNC cutter. In some embodiments the printer prints the graphic and the registration marks based on the printer instructions and the print is sent to the CNC cutter, which also receives the two-dimensional manufacturing drawing and matches up the registration marks from the two files, which is generally understood in the art. Other configurations are certainly contemplated.

In embodiments where one or more cut-out features of the designed structure are absent from the two-dimensional manufacturing drawings in the database 150, the system can be configured to map the cut-out feature location(s) on the designed structure from the client 120 to the acquired two-dimensional manufacturing drawings similarly to how graphics are mapped to the two-dimensional manufacturing drawings. In such embodiments, the client 120 can have a positional data generator that is configured to record data associated with the cut-out feature including the shape of the cut-out and the position and size of the cut-out relative to the designed structure and/or a three-dimensional component defining the cut-out feature. In such embodiments, the client 120 is configured to send that recorded data to the server 130 and the instruction module 160 is configured to receive and interpret the recorded data to map the cut-out feature to the relevant acquired two-dimensional manufacturing drawing.

After mapping the graphic(s) on the two-dimensional manufacturing drawing(s), the system 100 is generally configured to automatically send each acquired manufacturing drawing and the mapped graphic to the CNC cutting system 170. In particular, in a variety of embodiments the server 130 is configured to send each acquired two-dimensional manufacturing drawing to the CNC cutting system 170. The server 130 is generally configured to be at a location that is remote from the location of the CNC cutting system 170.

In some implementations of the current technology, after the components of the custom structure are produced by the CNC cutting system, the components are packaged and sent to a customer for assembly into the custom structure. The customer can be the user who designed the custom structure. In such implementations, the system can be configured to generate an image file of a packing list depicting each acquired two-dimensional manufacturing drawing. Each acquired two-dimensional manufacturing drawing can be depicted by its outline or an approximation of its outline, which can include, for example, a shaded region representing the shape of each respective two-dimensional manufacturing drawing. In other embodiments each acquired two-dimensional manufacturing drawing can be depicted by an image of a perspective view of the three-dimensional component corresponding to each two-dimensional manufacturing drawing. In some embodiments the packing list can reflect the graphics from the designed structure on the representations of corresponding two-dimensional drawings on the packing list. Additional or alternate data identifying each of the produced components of the custom structure can be added to the packing list.

The server 130 can be configured to send the image file of the packing list to a remote location, such as the location that will be shipping the package of produced three-dimensional components. Such an image file can be used in packaging the produced components to ensure each of the components are packed and shipped to the customer. In some embodiments such functionality is configured to be executed by a packing list module of the system 100, which can be a component of the server 130 or a separate component.

In some implementations of the current technology, the system is configured to prioritize orders for custom structures based on user information. User data used to make the order can be received by the client 120 through the user interface 110 which can be sent to the server 130 and then attached to the data sent to the cutting system 170 for production of the components. The client 120 and/or the server 130 can define order prioritization data such as user zip code or a request for prioritized order fulfillment.

Figure 12:
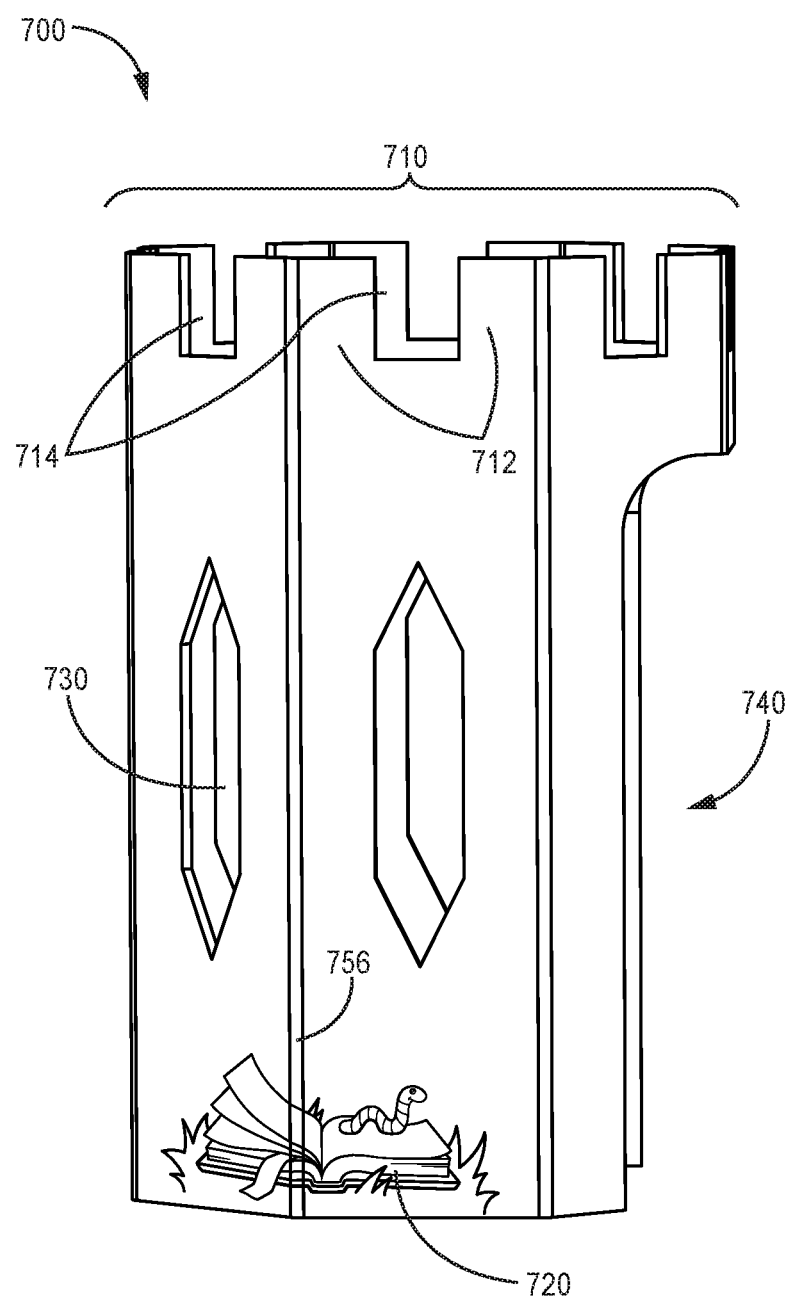
FIG. 12 depicts another example design of a custom structure that is a single three-dimensional component.

FIG. 12 depicts another example design of a custom structure, alternate to the custom structure depicted in FIG. 2. In the current example, the custom structure 700 is a play house tower that is a single three-dimensional component with a graphic 720. In this example design, the graphic 720 that is positioned on the structure 700 extends across a crease 756. Similar to the custom structure 1000 of FIG. 2, the currently-depicted custom structure defines a doorway 740 and at least one window 730. In the current example, the custom structure has a battlement 710 defined by merlons 712 and crenels 714, although the battlement 710 could be omitted in some designs. In some embodiments the custom structure 700 currently depicted could be a component of a larger custom structure.

Figure 13:
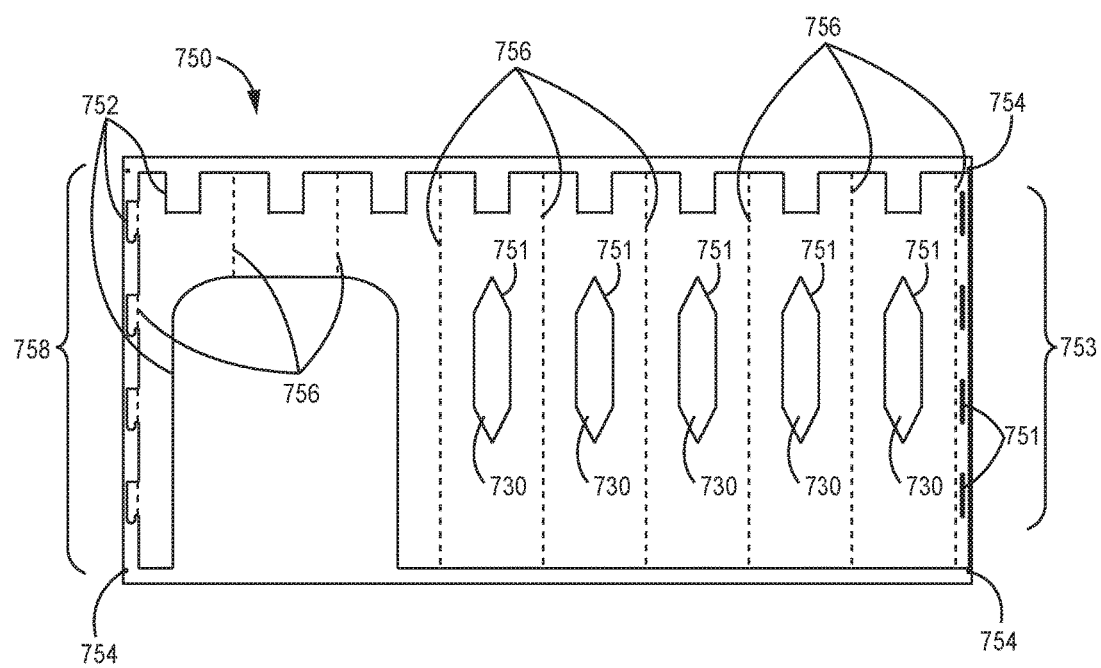
FIG. 13 depicts an example manufacturing drawing of the example custom structure of FIG. 12.

FIG. 13 depicts an example two-dimensional manufacturing drawing 750 consistent with the example custom structure of FIG. 12. The two-dimensional manufacturing drawing 750 defines perimeter cut locations 752 defining the outer perimeter of the sheet that will be used to construct the tower 700 (FIG. 12). The perimeter cut locations 752 also define the doorway 740, the battlement 710, and connector structures 758. A plurality of interior cut locations 751 define the windows 730 and connector receptacles 753 that are configured to receive the connector structures 758 to construct the tower 700. The two-dimensional manufacturing drawing 750 also defines crease lines 756 consistent with fold locations for constructing the three-dimensional structure. The two-dimensional manufacturing drawing 750 also defines registration marks 754.

Figure 14:
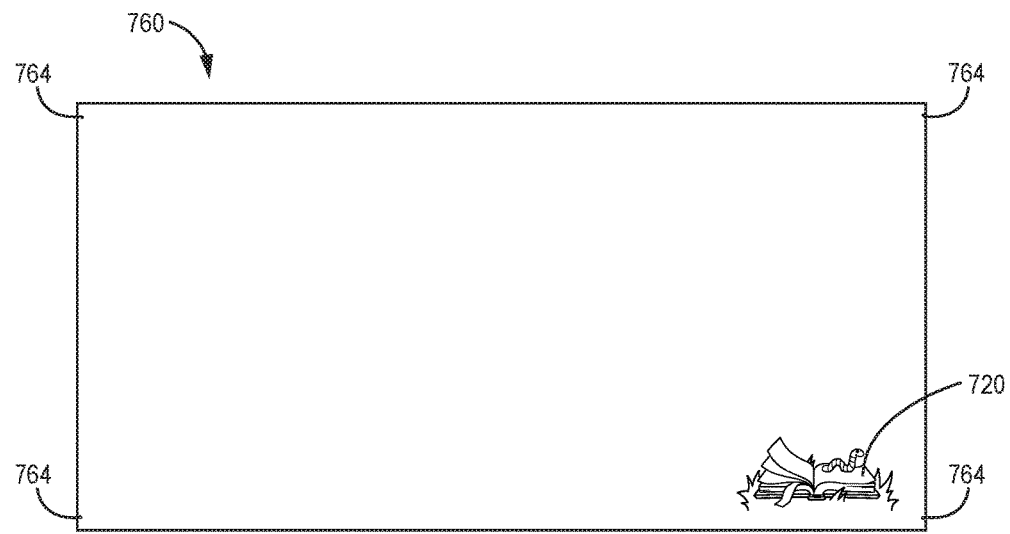
FIG. 14 depicts example printer instructions for the example custom structure of FIG. 12.

FIG. 14 depicts example printer instructions 760 consistent with the example custom structure of FIG. 12. The printer instructions 760 reflect the graphic 720 to be printed by the printer on the sheet used to construct the custom structure 700. In the current embodiment, registration marks 764 defined on the printer instructions 760 maps the position of the graphic 720 to the two-dimensional manufacturing drawing 750 consistently with the position of the graphic on the structure 700. While the registration mark is depicted as individual dots in the examples disclosed herein, one having ordinary skill in the art will appreciate that alternate configurations can be used. Further, in some embodiments a registration structure can be omitted and alternate approaches to mapping the graphic to the two-dimensional manufacturing drawing can be used.

The technology disclosed herein can be used to design and/or produce components for other types of play structures such as rocket ships, vehicles, houses, skyscrapers, and so on. In some embodiments the current technology can be used to produce components of custom structures that are not play houses, such as storage boxes, sheds, decorative items, exhibit booth backdrops, backdrops for the performance arts, and so forth.

Figure 15:
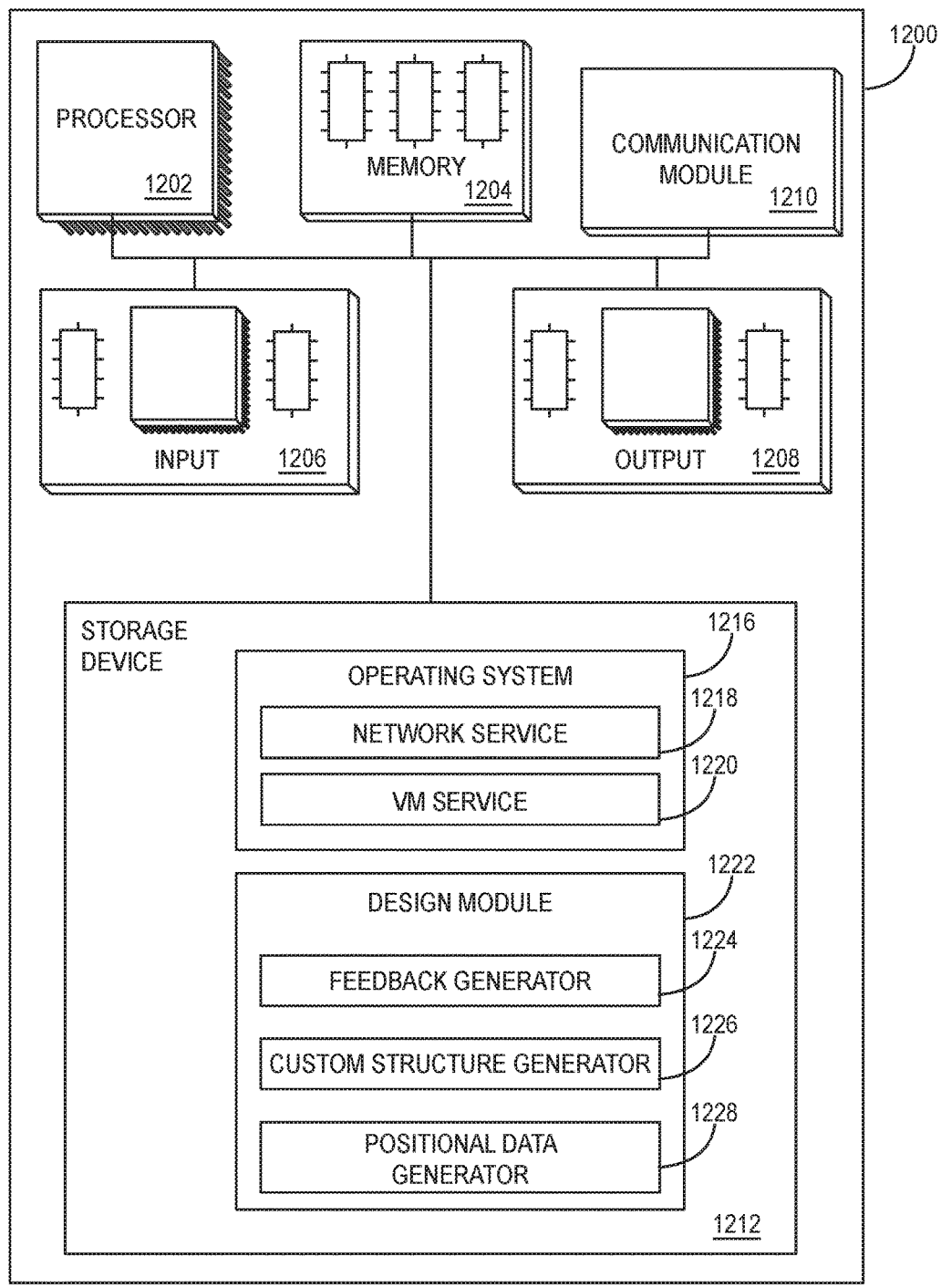
FIG. 15 is an example personal computing device consistent with some example implementations of the technology disclosed herein.

FIG. 15 is a schematic of one particular example of personal computing device 1200 consistent with example implementations of the technology disclosed herein. It will be appreciated that other computing devices can be used in other embodiments. Although the computing device 1200 is shown as a standalone computing device, the computing device 1200 may be any component or system that includes one or more processors or another suitable computing environment for executing software instructions in other examples, and need not include all of the components shown here.

As shown in the specific example of FIG. 15, the computing device 1200 has one or more processors 1202, memory 1204, one or more input devices 1206, one or more output devices 1208, one or more communication modules 1210, and one or more storage devices 1212. The computing device 1200 generally also has an operating system 1216 executable by computing device 1200. The operating system includes in various examples services such as a network service 1218 and a virtual machine service 1220. One or more applications, such as a client design module 1222 (that can be consistent with the client described above with reference to FIG. 1) are also stored on the storage device 1212, and are executable by the computing device 1200.

Each of the components 1202, 1204, 1206, 1208, 1210, and 1212 may be interconnected (physically, communicatively, and/or operatively) for inter-component communications, such as via one or more communications channels 1214. In some examples, the communication channels 1214 include a system bus, network connection, inter-processor communication network, or any other channel for communicating data. Applications such as the client design module 1222 and the operating system 1216 can communicate information with one another as well as with other components in the computing device 1200.

The processors 1202 are generally configured to implement functionality and/or process instructions for execution within the computing device 1200. For example, the processors 1202 can be capable of processing instructions stored in the storage device 1212 or the memory 1204. Examples of the processors 1202 include one or more of a microprocessor, a controller, a digital signal processor (DSP), an application specific integrated circuit (ASIC), a field-programmable gate array (FPGA), or similar discrete or integrated logic circuitry.

The one or more storage devices 1212 can be configured to store information within the computing device 1200 during operation. The storage device 1212, in some examples, is known as a computer-readable storage medium. In some examples, the storage device 1212 has temporary memory, meaning that a primary purpose of the storage device 1212 is not long-term storage. The storage device 1212 in some examples has a volatile memory, meaning that storage device 1212 does not maintain stored contents when the computing device 1200 is turned off. In other examples, data is loaded from the storage device 1212 into the memory 1204 during operation. Examples of volatile memories include random access memories (RAM), dynamic random access memories (DRAM), static random access memories (SRAM), and other forms of volatile memories known in the art. In some examples, the storage device 212 is used to store program instructions for execution by the processors 1202. The storage device 1212 and memory 1204, in various examples, are used by software or applications running on the computing device 1200 such as the client design module 1222 to temporarily store information during program execution.

The storage device 1212, in some examples, can have one or more computer-readable storage media configured to store larger amounts of information than volatile memory. The storage device 1212 can further be configured for long-term storage of information. In some examples, the storage device 1212 has non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

The computing device 1200 generally uses the communication module 1210 to communicate with external devices via one or more networks, such as one or more wireless or wired networks. The communication module 1210 can be a network interface card, such as an Ethernet card, an optical transceiver, a radio frequency transceiver, or any other type of device that can send and/or receive information. Other examples of such network interfaces include Bluetooth, cellular networks such as 3G, 4G, or LTE, Wi-Fi radios, and Near-Field Communications (NFC), and Universal Serial Bus (USB). In some examples, the computing device 1200 uses the communication module 1210 to communicate with an external device such as via public network such as the Internet.

The input device 1206 is generally a user interface configured to receive input from a user through tactile, audio, or video input. Examples of input device 1206 include a touchscreen display, a mouse, a keyboard, a voice responsive system, video camera, microphone or any other type of device for detecting input from a user.

The output device 1208 is generally a user interface configured to provide output to a user using tactile, audio, or video stimuli. The output device 1208, in one example, includes a display, a sound card, a video graphics adapter card, or any other type of device for converting a signal into an appropriate form understandable to humans or machines. Additional examples of output devices 1208 include a speaker, a light-emitting diode (LED) display, a liquid crystal display (LCD), or any other type of device that can generate output to a user.

The computing device 1200 can have the operating system 1216 and various services such as network service 1218 and virtual machine service 1220. The operating system 1216, in some examples, controls the operation of components of computing device 1200, and provides an interface from various applications such as the client design module 1222 to components of the computing device 1200. For example, the operating system 1216, in one example, facilitates the communication of various applications such as the client design module 1222 with the processors 1202, the communication module 1210, the storage device 1212, the input device 1206, and the output device 1208. Applications such as the client design module 1222 can have program instructions and/or data that are executable by the computing device 1200, and can receive, create, and store data. As one example, client design module 1222 can define instructions that cause the computing device 1200 to perform one or more of the operations and actions described in the examples presented herein above to perform the described functions associated with enabling a user to design a custom structure, such as a feedback generator 1224, a custom structure generator 1226 and a positional data generator 1228.

The system functionality described herein, including functionality of the disclosed server(s), modules and generators can be implemented by a processing device. In various embodiments, a non-transitory, computer-readable storage medium stores instructions configured to be executed by a processing device to achieve some or all of the functionality described herein. A computer-readable storage medium can be any mechanism for storing information in a form (e.g., software, processing application) readable by a machine (e.g., a computer). The machine-readable storage medium can include, but is not limited to non-volatile and volatile memories mentioned above, or other types of medium suitable for storing program instructions. In addition, program instructions may be communicated using optical, acoustical or other form of propagated signal (e.g., carrier waves, infrared signals, digital signals, etc.).

The system functionality described herein, including functionality of the disclosed server(s), modules and generators can correspond to a set of computer-readable instructions for performing one or more functions described above. These functions need not be implemented as separate software programs, procedures or modules, and thus various subsets of these modules may be combined or otherwise rearranged in various examples. In some examples, a computer-readable storage medium stores a subset of the functions identified above. Furthermore, the computer-readable storage medium can store additional data for functionality not described above.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:

1. A method for production of components of a custom structure comprising:
   electronically receiving a design remotely from a client, the design comprising:
   a representation of a structure having two or more three-dimensional components, and a representation of a graphic positioned on the structure;

acquiring, from a database, at least one two-dimensional manufacturing drawing corresponding to each three-dimensional component, wherein each manufacturing drawing defines a cut location;

in response to acquiring the at least one two-dimensional manufacturing drawing, mapping the graphic to the two-dimensional manufacturing drawing consistently with the position of the graphic on the structure;

electronically sending each acquired manufacturing drawing and the mapped graphic to a computer numeric control (CNC) cutting system; and the client displaying representations of a plurality of pre-defined three-dimensional components as options to a user through a user interface, wherein the representations of the two or more three-dimensional components are configured to be selected by the user through the user interface from the plurality of pre-defined three-dimensional components and the representations of the two or more three-dimensional components are configured to be coupled to each other by the user through the user interface to form the representation of the structure.

2. The method of claim 1, wherein mapping the graphic to the two-dimensional manufacturing drawing comprises automatically applying registration marks to the two-dimensional manufacturing drawing.

3. The method of claim 1, further comprising automatically generating printer instructions from the design, wherein the printer instructions comprise the graphic positioned on the two-dimensional manufacturing drawing.

4. The method of claim 3, wherein the printer instructions further comprise registration marks.

5. The method of claim 1, further comprising the client providing feedback when each representation of the two or more three-dimensional components is coupled to another representation of the two or more three-dimensional components by the user at an acceptable location to form the structure.

6. The method of claim 1, wherein at least one manufacturing drawing defines a crease line.

7. The method of claim 1, further comprising automatically generating an image file of a packing list depicting each acquired two-dimensional manufacturing drawing.

8. The method of claim 1, wherein the structure defines one or more cut-out features.

9. The method of claim 8, further comprising automatically mapping the one or more cut-out features to the two-dimensional manufacturing drawing.

10. A system for production of components of custom structures comprising:

a database having a plurality of two-dimensional manufacturing drawings each defining a cut location;

a server configured to receive a user design of a structure defined by a representation of one or more three-dimensional components and a graphic, wherein each of the three-dimensional components has at least one corresponding two-dimensional manufacturing drawing in the database;

a selection module configured to acquire each of the corresponding two-dimensional manufacturing drawings from the database in response to receiving the user design of the structure;

an instruction module configured to receive the two-dimensional manufacturing drawings and map the graphic to one or more of the acquired two-dimensional manufacturing drawings consistently with the user design of the structure;

wherein the server is further configured to send each acquired two-dimensional manufacturing drawing and the mapped graphic to a computer numeric control (CNC) cutting system; and a client configured to:

display representations of a plurality of three-dimensional components on a user interface as options for a user to design the structure; and allow the user to couple a selected representation of a three-dimensional component to another selected representation of a three-dimensional component on the user interface to design the structure.

11. The system of claim 10, wherein the client is further configured to provide feedback to the user when the selected representation of the three-dimensional component is coupled to the other selected representation of the three-dimensional component in an acceptable location.

12. The system of claim 10, wherein the representations of the plurality of three-dimensional components corresponds to the plurality of two-dimensional manufacturing drawings in the database.

13. The system of claim 10, further comprising a packing list module configured to generate an image file of each corresponding two-dimensional manufacturing drawing, wherein the server is configured to send the image file to a remote location.

14. The system of claim 10, wherein the instruction module is further configured to apply registration marks to the one or more acquired two-dimensional manufacturing drawings.

15. The system of claim 10, wherein the instruction module is further configured to generate printer instructions comprising the graphic positioned on the one or more acquired two-dimensional manufacturing drawings.

16. The system of claim 10, wherein a portion of the plurality of two-dimensional manufacturing drawings define a crease line.

17. The system of claim 10, wherein one or more of the plurality of two-dimensional manufacturing drawings defines a cut-out feature.

18. The system of claim 10, wherein the user design of the structure defines at least one cut-out feature and the instruction module is further configured to map the at least one cut-out feature to an acquired two-dimensional manufacturing drawing.

* * * * *